(12) United States Patent
Horie et al.

(10) Patent No.: US 9,925,870 B2
(45) Date of Patent: Mar. 27, 2018

(54) FOUR-WHEEL-DRIVE VEHICLE

(71) Applicant: TOYOTA JIDOSHA KABUSHIKI KAISHA, Toyota-shi, Aichi-ken (JP)

(72) Inventors: Ryota Horie, Nagoya (JP); Takahiro Yoshimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 15/094,504

(22) Filed: Apr. 8, 2016

(65) Prior Publication Data

US 2016/0303966 A1    Oct. 20, 2016

(30) Foreign Application Priority Data

Apr. 16, 2015    (JP) .................................. 2015-084589

(51) Int. Cl.

| | |
|---|---|
| *B60K 17/34* | (2006.01) |
| *B60K 17/35* | (2006.01) |
| *F16H 37/06* | (2006.01) |
| *F16D 11/14* | (2006.01) |
| *F16D 23/04* | (2006.01) |
| *F16D 27/118* | (2006.01) |
| *F16D 27/12* | (2006.01) |
| *B60K 23/08* | (2006.01) |

(Continued)

(52) U.S. Cl.
CPC .......... *B60K 17/35* (2013.01); *B60K 23/0808* (2013.01); *F16D 11/14* (2013.01); *F16D 23/04* (2013.01); *F16D 27/118* (2013.01); *F16D 27/12* (2013.01); *B60K 17/02* (2013.01); *B60K 2023/0833* (2013.01); *B60Y 2400/421* (2013.01); *F16D 2011/008* (2013.01); *F16D 2023/0668* (2013.01)

(58) Field of Classification Search
CPC ...... F16H 37/065; B60K 17/34; B60K 17/348
USPC .................................................. 74/665 F, 335
See application file for complete search history.

(56) References Cited

U.S. PATENT DOCUMENTS

| | | | |
|---|---|---|---|
| 1,898,190 A | | 2/1933 | Kohler |
| 4,605,087 A | * | 8/1986 | Ashauer ............. B60K 17/3505 180/233 |

(Continued)

FOREIGN PATENT DOCUMENTS

| | | |
|---|---|---|
| JP | S45-027134 Y1 | 10/1970 |
| JP | S56-120422 U | 9/1981 |

(Continued)

*Primary Examiner* — Ha Dinh Ho
(74) *Attorney, Agent, or Firm* — Oliff PLC

(57) ABSTRACT

A four-wheel-drive vehicle includes a driving source, main driving wheels, auxiliary driving wheels, a power transmitting member, a first mesh clutch, and a second mesh clutch. Meshing teeth on the driving source side of the first mesh clutch each have, along an entire tooth width thereof, an inclined surface in which a length in a rotational axis direction increases in a direction in which the meshing teeth on the driving source side rotate when the four-wheel-drive vehicle is traveling forward. The meshing teeth on the power transmitting member side of the first mesh clutch each have, along an entire tooth width thereof, an inclined surface in which a length in a rotational axis direction decreases in a direction in which the meshing teeth on the driving source side rotate when the four-wheel-drive vehicle is traveling forward.

4 Claims, 5 Drawing Sheets

(51) Int. Cl.
    *F16D 11/00*     (2006.01)
    *F16D 23/06*     (2006.01)
    *B60K 17/02*     (2006.01)

(56) References Cited

U.S. PATENT DOCUMENTS

| | | | |
|---|---|---|---|
| 4,938,306 A * | 7/1990 | Sumiyoshi | B60K 17/3505 180/233 |
| 5,562,566 A * | 10/1996 | Yang | B60K 6/365 180/65.25 |
| 6,849,017 B2 * | 2/2005 | Nett | B60K 6/365 475/151 |
| 7,331,896 B1 * | 2/2008 | Kroppe | B60K 17/346 475/221 |
| 8,215,440 B2 * | 7/2012 | Hoffmann | B60K 23/0808 180/233 |
| 2006/0027434 A1 | 2/2006 | Capito | |
| 2011/0179906 A1 | 7/2011 | Juenemann et al. | |
| 2015/0053046 A1 | 2/2015 | Ibusuki | |

FOREIGN PATENT DOCUMENTS

| | | |
|---|---|---|
| JP | S59-54221 U | 4/1984 |
| JP | 2006-046663 A | 2/2006 |
| JP | 2009-293675 A | 12/2009 |
| JP | 2013-237338 A | 11/2013 |
| JP | 2015-193368 A | 11/2015 |
| WO | 2015/145241 A1 | 10/2015 |

* cited by examiner

FOUR-WHEEL-DRIVE VEHICLE

INCORPORATION BY REFERENCE

The disclosure of Japanese Patent Application No. 2015-084589 filed on Apr. 16, 2015 including the specification, drawings and abstract is incorporated herein by reference in its entirety.

BACKGROUND OF THE INVENTION

1. Field of the Invention

The invention relates to technology in a four-wheel-drive vehicle, which increases switching the reliability and shortens the switching time of a mesh clutch provided in the four-wheel-drive vehicle.

2. Description of Related Art

A four-wheel-drive (4WD) vehicle with a disconnect function is known that is provided with a first mesh clutch as a connecting/disconnecting mechanism that selectively connects and disconnects a power transmitting path between a driving source and a power transmitting member, and a second mesh clutch as a connecting/disconnecting member that selectively connects and disconnects a power transmitting path between auxiliary driving wheels and the power transmitting member. This four-wheel-drive vehicle is able to be selectively placed in a two-wheel-drive (2WD) state in which driving force is transmitted from the driving source to left and right main driving wheels by disengagement of a first mesh clutch and a second mesh clutch, and a four-wheel-drive (4WD) state in which driving force is also transmitted from the driving source to left and right auxiliary driving wheels by engagement of the first mesh clutch and the second mesh clutch. The four-wheel-drive vehicle described in US 2011/0179906 A1, for example, is one such four-wheel-drive vehicle.

In the four-wheel-drive vehicle described in US 2011/0179906 A1, the mesh clutch is not provided with a synchronizing mechanism that synchronizes the rotation on the driving source side of the mesh clutch with the rotation on the power transmitting member side of the mesh clutch. Therefore, the kind of four-wheel-drive vehicle described in US 2011/0179906 A1 is only able to be placed in the four-wheel-drive state when the vehicle is stopped, which is inconvenient and thus problematic. One conceivable way to alleviate this kind of problem is to provide the mesh clutch with the synchronizing mechanism described above.

SUMMARY OF THE INVENTION

Considering a four-wheel-drive vehicle that has a synchronizing mechanism provided with the first mesh clutch, for example, when a disconnected state in which the first mesh clutch and the second mesh clutch are released, i.e., the power transmitting path between the driving source and the power transmitting mechanism and the power transmitting path between the auxiliary driving wheels and the power transmitting mechanism are both disconnected, is canceled from a state in which the disconnected state is established, it is necessary to synchronize the rotation of meshing teeth (dog teeth) of the first mesh clutch with the synchronizing mechanism, and move the first meshing teeth on the driving source side of the first mesh clutch and the second meshing teeth on the power transmitting member side of the first mesh clutch relatively close together so that these meshing teeth intermesh. However, with a four-wheel-drive vehicle such as that described above, there are cases in which the switching time for connecting the power transmitting path between the driving source and the power transmitting member in the first mesh clutch is relatively long, and the reliability of the switch (i.e., the switching reliability) is comparatively low.

The invention thus provides a four-wheel-drive vehicle that shortens the switching time of the first mesh clutch and increases the switching reliability.

Through various testing, the inventors have come to realize the following. That is, in the four-wheel-drive vehicle described above, when the first meshing teeth and the second meshing teeth come close together and abut, resistance torque of the second meshing teeth is relatively small due to the fact that the power transmitting path between the power transmitting member and the auxiliary driving wheels is not connected, so the second meshing teeth are brought around with the first meshing teeth, and the synchronization of the rotation speeds of the meshing teeth becomes difficult to break when the first meshing teeth abut against the second meshing teeth. Therefore, the teeth of the second meshing teeth will not easily fit in between the teeth of the first meshing teeth, so breaking synchronization, which is necessary to engage the first meshing teeth with the second meshing teeth, may be difficult. Also, it was also discovered that, in a four-wheel-drive vehicle such as that described above, providing a one-sided chamfer (a chamfer along the entire tooth width) on the first meshing teeth and the second meshing teeth of the first mesh clutch is effective to break synchronization. This invention is based on these findings.

One aspect of the invention relates to a four-wheel-drive vehicle that includes a driving source, main driving wheels, auxiliary driving wheels, a power transmitting member, a first mesh clutch, and a second mesh clutch. The main driving wheels are configured such that driving force from the driving source is transmitted to the main driving wheels. The power transmitting member is configured to transmit power from the driving source to the auxiliary driving wheels. The first mesh clutch is configured to selectively connect and disconnect a power transmitting path between the driving source and the power transmitting member. The first mesh clutch includes a synchronizing mechanism. The synchronizing mechanism is configured to synchronize rotation of meshing teeth on the driving source side of the first mesh clutch with rotation of meshing teeth on the power transmitting member side of the first mesh clutch before the first mesh clutch is engaged. The second mesh clutch is configured to selectively connect and disconnect a power transmitting path between the auxiliary driving wheels and the power transmitting member. The four-wheel-drive vehicle is configured to synchronize the rotation of the meshing teeth of the first mesh clutch with the synchronizing mechanism and engage the first mesh clutch, and then engage the second mesh clutch, when a disconnected state in which the first mesh clutch and the second mesh clutch are released is canceled from a state in which the disconnected state is established. The meshing teeth on the driving source side of the first mesh clutch each have, along an entire tooth width thereof, an inclined surface in which a length in a rotational axis direction increases in a direction in which the meshing teeth on the driving source side rotate when the four-wheel-drive vehicle is traveling forward. The meshing teeth on the power transmitting member side of the first mesh clutch each have, along an entire tooth width thereof, an inclined surface in which a length in a rotational axis direction decreases in a direction in which the meshing teeth on the driving source side rotate when the four-wheel-drive vehicle is traveling forward.

With the four-wheel-drive vehicle according to this aspect, the meshing teeth on the driving source side of the first mesh clutch each have, along an entire tooth width thereof, an inclined surface in which a length in a rotational axis direction increases in a direction in which the meshing teeth on the driving source side rotate when the four-wheel-drive vehicle is traveling forward, and the meshing teeth on the power transmitting member side of the first mesh clutch each have, along an entire tooth width thereof, an inclined surface in which a length in a rotational axis direction decreases in a direction in which the meshing teeth on the driving source side rotate when the four-wheel-drive vehicle is traveling forward. When the meshing teeth on the driving source side fit in between the meshing teeth on the power transmitting member side, the rotation speed of the meshing teeth on the power transmitting member side wants to decrease relative to the meshing teeth on the driving source side due to the rotational resistance of the power transmitting member. Therefore, if a mountain-shaped chamfer is provided on each of the meshing teeth, for example, a component force that tries to separate the meshing teeth in the rotational axis direction acts by the abutment of these chamfered portions, and tooth jump may consequently occur. However, with the invention, the one-sided chamfer having the inclined surface is provided along the entire tooth width of each of the meshing teeth, so the meshing teeth on the driving source side and the meshing teeth on the power transmitting member side abut at surfaces that are parallel to the rotational axis, which are formed on the meshing teeth. Therefore, a component force that tries to separate the meshing teeth in the rotational axis direction is not generated, and movement in the rotational axis direction of the meshing teeth on the driving source side toward the meshing teeth on the power transmitting member side is no longer impeded.

In the four-wheel-drive vehicle according to the aspect described above, the meshing teeth on the power transmitting member side of the second mesh clutch and the meshing teeth on the auxiliary driving wheel side of the second mesh clutch may have a flat shape in which a length in a rotational axis direction does not change in a direction in which the meshing teeth on the auxiliary driving wheel side rotate when the four-wheel-drive vehicle is traveling forward. For example, when using a differential gear unit having a chamfer on the meshing teeth of the second mesh clutch, and the rotational direction of differential rotation of the meshing teeth changes in the second mesh clutch when the disconnected state is canceled, tooth jump may occur due to the abutment of the chamfered portions of these meshing teeth. However, according to the aspect described above, by making the meshing teeth of the second mesh clutch flat, jumping of the meshing teeth in the second mesh clutch is able to be prevented even if the rotational direction of differential rotation of the meshing teeth changes.

In the four-wheel-drive vehicle according to the aspect described above, long meshing teeth in which the length in the rotational axis direction is long and short meshing teeth in which the length in the rotational axis direction is short may be arranged alternately in the direction in which the meshing teeth rotate, in the second mesh clutch. According to this aspect, even if the accelerator is suddenly depressed a large amount, for example, such that the main driving wheels slip and the relative rotation speed of the meshing teeth in the second mesh clutch becomes relatively large when the four-wheel-drive vehicle is traveling, for example, the time that it takes from when the flat surfaces of the meshing teeth are abutted together until the meshing teeth abut the next time doubles, so sufficient travel time of the meshing teeth that travel in the meshing direction is able to be ensured. Therefore, jumping of the meshing teeth in the second mesh clutch is able to be suitable inhibited.

In the four-wheel-drive vehicle according to the aspect described above, the four-wheel-drive vehicle may be configured to prohibit the disconnected state from being canceled when the four-wheel-drive vehicle is traveling in reverse. The rotational direction of the differential rotation of the meshing teeth of the first mesh clutch when the four-wheel-drive vehicle is traveling forward is the opposite direction when the four-wheel-drive vehicle is traveling in reverse, so when the disconnected state is canceled, jumping tends to occur due to the abutment of the chamfered portions of the meshing teeth of the first mesh clutch. With the four-wheel-drive vehicle according to this aspect, when the four-wheel-drive vehicle is traveling in reverse, jumping of the meshing teeth of the first mesh clutch is able to be suitably inhibited by prohibiting cancelation of the disconnected state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings. The drawings described in the example embodiments below have been simplified or modified as appropriate, so the scale ratios and the shapes and the like of the portions are not always accurately depicted.

Figure 1:
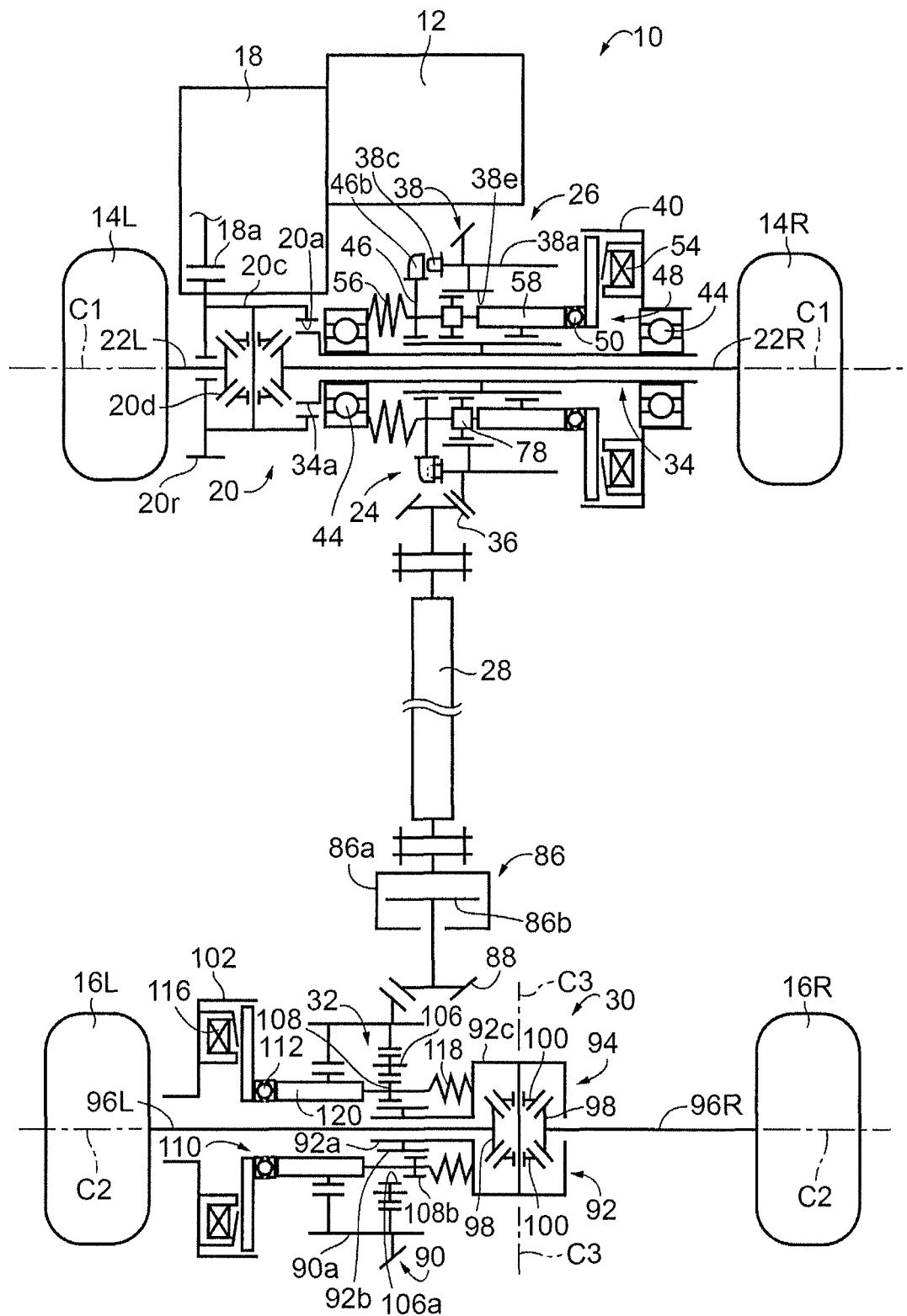
FIG. 1 is a skeleton view of the general structure of a four-wheel-drive vehicle to which the invention has been suitably applied.

FIG. 1 is a skeleton view of the general structure of a four-wheel-drive (4WD) vehicle 10 to which the invention has been suitably applied. In FIG. 1, the 4WD vehicle 10 includes an engine 12 as a driving source, and is provided with a front engine front wheel drive (FF)-based four-wheel-drive system that has a first power transmitting path that transmits power from the engine 12 to left and right front wheels 14L and 14R (simply referred to as "front wheels 14" unless otherwise specified) that correspond to main driving wheels, and a second power transmitting path that transmits power from the engine 12 to left and right rear wheels 16L and 16R (simply referred to as "rear wheels 16" unless otherwise specified) that correspond to auxiliary driving wheels. When the 4WD vehicle 10 is in a two-wheel-drive (2WD) state, driving force transmitted from the engine 12 via an automatic transmission 18 is transmitted to the left and right front wheels 14L and 14R via a front wheel differential gear unit 20 and left and right wheel axles 22L and 22R. In this 2WD state, a first mesh clutch 24 and a second mesh clutch 32 are released, and driving force is not transmitted to a transfer 26, a propeller shaft (a power transmitting member) 28, and a rear wheel differential gear unit 30 and the rear wheels 16. However, in a four-wheel-drive (4WD) state, in addition to the two-wheel-drive state described above, both the first mesh clutch 24 and the second mesh clutch 32 are engaged, and driving force from the engine 12 is transmitted to the transfer 26, the propeller shaft 28, and the rear wheel differential gear unit 30 and the rear wheels 16. Although not shown in FIG. 1, a clutch or a torque converter that is a power fluid transmitting device is provided between the engine 12 and the automatic transmission 18.

The automatic transmission 18 is a stepped automatic transmission that is provided with a plurality of planetary gear sets and friction devices (clutches and brakes), and is configured such that a speed is able to be selected by selectively engaging these friction devices. The automatic transmission 18 may also be formed by a stepped automatic transmission configured such that a speed of a constant mesh parallel shaft transmission is selected by a shift actuator and a select actuator. The automatic transmission 18 may also be formed by a continuously variable transmission configured such that a speed ratio is able to be continuously changed by changing the effective radius of a pair of variable pulleys in which the effective radius is variable and around which a drive belt is wound. This automatic transmission 18 is well-known technology, so a description of the specific structure and operation thereof is omitted.

The front wheel differential gear unit 20 includes a ring gear 20r, a differential case 20c, and differential gears 20d. The ring gear 20r is rotatably provided around a rotational axis C1, and meshes with an output gear 18a of the automatic transmission 18. The differential case is fixed to the ring gear 20r. The differential gears 20d are housed inside the differential case 20c. The front wheel differential gear unit 20 transmits the driving force to the left and right wheel axles 22L and 22R of the front wheels 14, while allowing differential rotation of these left and right wheel axles 22L and 22R. Internal teeth 20a are formed on an inner periphery of the differential case 20c, and mesh with first external spline teeth 34a formed on an outer periphery of an axial end of an input shaft 34 provided in the transfer 26. As a result, some of the driving force to be transmitted from the engine 12 to the left and right front wheels 14L and 14R via the differential case 20c is input to the transfer 26 via the input shaft 34.

Figure 2:
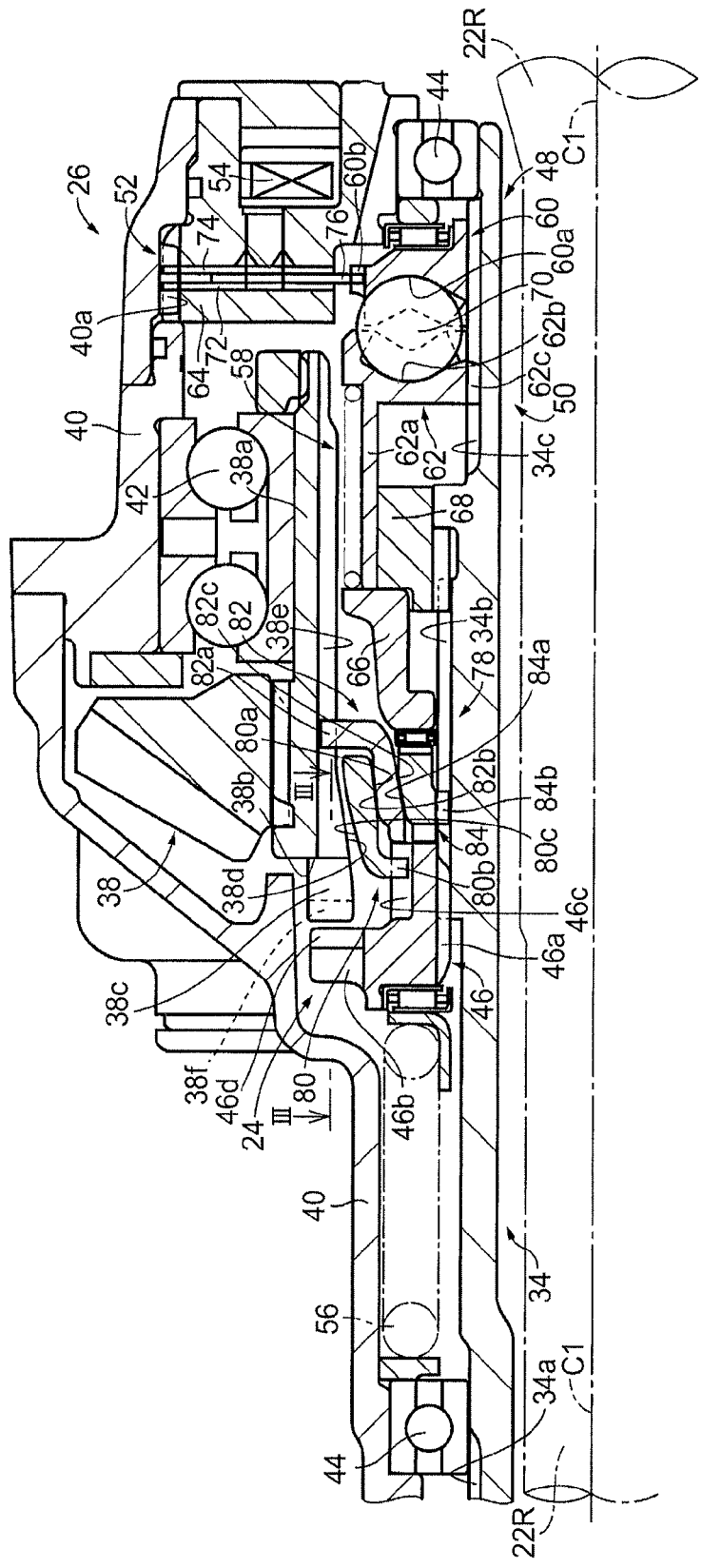
FIG. 2 is a sectional view of the structure of a transfer provided in the four-wheel-drive vehicle in FIG. 1.

As shown in FIGS. 1 and 2, the transfer 26 includes a cylindrical first ring gear 38, the cylindrical input shaft 34, and the first mesh clutch 24. The first ring gear 38 meshes with a driven pinion 36 in order to transmit power to the driven pinion 36. The driven pinion 36 is connected to one end portion of the propeller shaft 28 in order to drive the propeller shaft 28. The input shaft 34 receives some of the driving force transmitted from the engine 12 to the left and right front wheels 14L and 14R via the differential case 20c. The first mesh clutch 24 connects/disconnects the differential case 20c that is connected to the front wheels 14 so as to be able to transmit power thereto, to/from the propeller shaft 28, i.e., connects/disconnects the input shaft 34 that is connected to the differential case 20c to/from the first ring gear 38 that is connected to the propeller shaft 28, in the power transmitting path from the front wheels 14 to the propeller shaft 28. When the first mesh clutch 24 is engaged and the power transmitting path between the input shaft 34 and the first ring gear 38 is connected, some of the driving force to be transmitted from the engine 12 to the left and right front wheels 14L and 14R is output to the left and right rear wheels 16L and 16R via the propeller shaft 28.

The cylindrical first ring gear 38 is a bevel gear on which inclined teeth or a hypoid gear is formed, for example, and has a shaft portion 38a that protrudes in a generally cylindrical shape from an inner peripheral portion of the first ring gear 38 toward the front wheel 14R side, as shown in FIG. 2. Also, the cylindrical first ring gear 38 is rotatably supported in a cantilevered manner around the rotational axis C1 by the shaft portion 38a being supported by a bearing 42 provided inside a first unit case 40.

The cylindrical input shaft 34 passes through the inside of the cylindrical first ring gear 38, and a portion of the input shaft 34 is arranged inside the first ring gear 38, as shown in FIG. 2. Also, the cylindrical input shaft 34 is rotatably supported around the rotational axis C1, i.e., supported so as to be able to rotate concentrically with the first ring gear 38, by being supported at both end portions by a pair of bearings 44 provided inside the first unit case 40. Also, first external spline teeth 34a formed on an outer peripheral surface of an end portion on the front wheel 14L side of the input shaft 34, second external spline teeth 34b formed on an outer peripheral surface of the center portion of the input shaft 34, and third external spline teeth 34c formed on an outer peripheral surface of an end portion on the front wheel 14R side of the input shaft 34, are integrally provided on the cylindrical input shaft 34.

The first mesh clutch 24 is a connecting/disconnecting mechanism (a dog clutch) for connecting/disconnecting the power transmitting path between the engine 12 and the propeller shaft 28, i.e., the power transmitting path between the cylindrical input shaft 34 that is connected to the engine 12 so as to be able to transmit power, and the first ring gear 38 that is connected to the propeller shaft 28 so as to be able to transmit power, in the transfer 26. The first mesh clutch 24 includes first meshing teeth (dog teeth) 38c formed on a side surface 38b on the front wheel 14L side of the shaft portion 38a of the cylindrical first ring gear 38, and a cylindrical first movable sleeve 46 that has internal meshing teeth 46a and first meshing teeth (dog teeth) 46b. The internal meshing teeth 46a mesh with the second external spline teeth 34b of the cylindrical input shaft 34 such that the first movable sleeve 46 is able to move in the rotational axis C1 direction and is unable to rotate relative to the input shaft 34 around the rotational axis C1. The first meshing teeth 46b are able to mesh with the first meshing teeth 38c by the first movable sleeve 46 moving in the rotational axis C1 direction. The first mesh clutch 24 is configured such that some of the driving force transmitted from the engine 12 to the left and right front wheels 14L and 14R is output via the propeller shaft 28 to the left and right rear wheels 16L and 16R, according to whether the first meshing teeth 38c that are integrally formed on the cylindrical first ring gear 38 and the first meshing teeth 46b that are integrally formed on the outer diameter side of the first movable sleeve 46 are in mesh or not in mesh.

The transfer 26 is provided with a first moving mechanism 48 that moves the first movable sleeve 46 in the rotational axis C1 direction, and moves the first movable sleeve 46 to a first connect position and a first disconnect position, as shown in FIG. 2. The first connect position is a position where the first movable sleeve 46 moves in the rotational axis C1 direction and the first meshing teeth 46b of the first movable sleeve 46 mesh with the first meshing teeth 38c of the first ring gear 38. In the first connect position, the first ring gear 38 is unable to rotate relative to the input shaft 34. Also, the first disconnect position is a position where the first movable sleeve 46 moves in the rotational axis C1 direction and the first meshing teeth 46b of the first movable sleeve 46 does not mesh with the first meshing teeth 38c of the first ring gear 38. In the first disconnect position, the first ring gear 38 and the input shaft 34 are able to rotate relative to each other, and the first mesh clutch 24 is released.

The first moving mechanism 48 is provided with a first ball cam 50, a first auxiliary clutch 52, a first actuator 54, a first spring 56, and a first ratchet mechanism (catch/release mechanism) 58. The first actuator 54 is an electromagnetic coil that makes the first auxiliary clutch 52 generate rotation braking torque. The first actuator 54 is integrally fixed to the first unit case 40. The first ball cam 50 is a device that converts rotary force of the input shaft 34 into thrust in the rotational axis C1 direction of the input shaft 34 when rotation braking torque is generated in an annular second cage 60, described later, via the first auxiliary clutch 52 by the first actuator 54. The first ratchet mechanism 58 moves the first movable sleeve 46 and maintains the moving position of the first movable sleeve 46 with thrust converted by the first ball cam 50. The first spring 56 is interposed between the first movable sleeve 46 and a bearing 44 on the front wheel 14L side, from among the pair of bearings 44, and urges the first movable sleeve 46 from the first disconnect position toward the first connect position. That is, the first spring 56 urges the first movable sleeve 46 toward the front wheel 14R side in the rotational axis C1 direction. As a result, the first moving mechanism 48 applies rotation braking torque to the second cage 60 with the first actuator 54 and the first auxiliary clutch 52 to generate thrust in the rotational axis C1 direction in the first ball cam 50, and move the first movable sleeve 46 in the rotational axis C1 direction against the urging force of the first spring 56 via the first ratchet mechanism 58 with a first cage 62 that will be described later.

The first ratchet mechanism 58 includes an annular first piston 62a, an annular second piston 66, and an annular holder 68. The first piston 62a is moved in a reciprocating manner (back and forth) in the rotational axis C1 direction a predetermined stroke via the first ball cam 50 by an electromagnetic coil, i.e., the first actuator 54, attracting a disk-shaped movable piece 64. The second piston 66 is provided in a manner able to rotate relative to the input shaft 34, and is moved in the rotational axis C1 direction against the urging force of the first spring 56 by the first piston 62a. The holder 68 has retaining teeth 86a (see FIGS. 6A to 6E), and is provided in a manner unable to rotate relative to the input shaft 34 and unable to move in the rotational axis C1 direction, and retains the second piston 66 moved by the first piston 62a with the retaining teeth 68a. In the first ratchet mechanism 58, the first movable sleeve 46 is moved by the second piston 66 against the urging force of the first spring 56 toward the first disconnect position, by the first piston 62a being moved back and forth in the rotational axis C1 direction, and the second piston 66 is retained by the retaining teeth 68a of the holder 68. Then, when the first piston 62a is again moved back and forth in the rotational axis C1 direction, the second piston 66 is released from the retaining teeth 68a of the holder 68, and the first movable sleeve 46 moves toward the first connect position by the urging force of the first spring 56. As shown in FIG. 2, the first piston 62a of the first ratchet mechanism 58 is integrally provided on the first cage 62 of the first ball cam 50, and the first ratchet mechanism 58 is arranged between the first movable sleeve 46 and the second cage 60 of the first ball cam 50.

The first ball cam 50 has a pair of annular cages, i.e., the first cage 62 and the second cage 60, and a plurality of (e.g., three) spherical rolling elements 70, provided between the second piston 66 of the first ratchet mechanism 58 and the bearing 44 on the front wheel 14R side, from among the pair of bearings 44. The pair of cages, i.e., the first cage 62 and the second cage 60, are interposed in a manner overlapping in the rotational axis C1 direction. The plurality of (e.g., three) spherical rolling elements 70 are provided in a plurality of locations (e.g., three locations) in the circumferential direction in the first cage 62 and the second cage 60, and are sandwiched by a pair of groove-shaped cam surfaces 60a and 62b that face each other and have depths that change in the circumferential direction. When the first cage 62 and the second cage 60 are rotated relative to each other, the first cage 62 and the second cage 60 move away from each other in the rotational axis C1 direction. As a result, when the first piston 62a is moved back and forth once toward the front wheel 14R side and the front wheel 14L side in the rotational axis C1 direction by the first ball cam 50, the first movable sleeve 46 moves toward the first disconnect position against the urging force of the first spring 56 via the first ratchet mechanism 58, as shown in the transfer 26 above the rotational axis C1 shown in FIG. 2, i.e., on the engine 12 side. Then, the first meshing teeth 46b of the first movable sleeve 46 come out of mesh with the first meshing teeth 38c of the first ring gear 38, such that the first mesh clutch 24 releases. Also, when the first piston 62a moves back and forth twice by the first ball cam 50, i.e., when the first movable sleeve 46 is placed in the first disconnect position, and then the first piston 62a moves back and forth once, although not shown, the second piston 66 is released from the retaining teeth 68a of the holder 68 and the first movable sleeve 46 moves to the first connect position by the urging force of the first spring 56. Then, the first meshing teeth 46b of the first movable sleeve 46 intermesh with the first meshing teeth 38c of the first ring gear 38, such that the first mesh clutch 24 engages.

Also, the first auxiliary clutch 52 that has a pair of disk-shaped first friction plates 72 and 74 and a disk-shaped second friction plate 76, is arranged between an electromagnetic coil, i.e., the first actuator 54, and the movable piece 64. As shown in detail in FIG. 2, the first friction plates 72 and 74 are arranged between the electromagnetic coil and the movable piece 64, and are engaged with internal spline teeth 40a formed on the first unit case 40, in a manner unable to rotate around the rotational axis C1 but able to move in the rotational axis C1 direction. The second friction plate 76 is arranged between the pair of first friction plates 72 and 74, and is engaged with external spline teeth 60b formed on the second cage 60, in a manner unable to rotate around the rotational axis C1 but able to move in the rotational axis C1 direction. Also, the groove-shaped cam surfaces 62b and 60a formed in a plurality of locations in the circumferential direction between the annular first cage 62 and the annular second cage 60 are inclined such that the distance in the rotational axis C1 direction between these cam surfaces 62b and 60a becomes shorter farther along in the circumferential direction. Also, internal meshing teeth 62c that mesh with the third external spline teeth 34c of the input shaft 34, in a manner unable to rotate relative to the third external spline teeth 34c but able to move in the rotational axis C1 direction, are formed on the inner peripheral surface of the first cage 62.

With the electromagnetic coil, i.e., the first actuator 54, the first auxiliary clutch 52, and the first ball cam 50 structured as described above, when the movable piece 64 is attracted by the electromagnetic coil while the input shaft 34 is rotating while the vehicle is running, for example, the first friction plates 72 and 74 and the second friction plate 76 of the first auxiliary clutch 52 are squeezed between the movable piece 64 and the electromagnetic coil by the movable piece 64, such that rotation braking torque is transmitted to the second friction plate 76. That is, when the movable piece 64 is attracted by the electromagnetic coil, rotation braking torque is transmitted to the second cage 60 via the second friction plate 76 of the first auxiliary clutch 52. Therefore, the first cage 62 and the second cage 60 rotate relative to each other by the rotation braking torque, and the first piston 62a integrally formed on the first cage 62 moves toward the front wheel 14L side against the urging force of the first spring 56 in the rotational axis C1 direction with respect to the second cage 60 via the spherical rolling elements 70, such that the rotary force of the input shaft 34 is converted into thrust in the rotational axis C1 direction. Also, when the movable piece 64 is not being attracted to the electromagnetic coil, the second cage 60 is able to rotate relative to the first unit case 40, so the second cage 60 is brought around with the first cage 62 via the spherical rolling elements 70, and the second cage 60 and the first cage 62 rotate together. As a result, the first piston 62a stops moving back and forth in the rotational axis C1 direction.

FIGS. 6A to 6E are views showing frame formats illustrating the operating principle of the first ratchet mechanism 58, and show expanded views of the annular first piston 62a, the annular second piston 66, and the annular holder 68. As described above, the first ratchet mechanism 58 functions as a retaining mechanism and includes the annular first piston 62a, the annular second piston 66, and the annular holder 68. A protrusion 66a that protrudes on the holder 68 side is formed on the annular second piston 66. Also, the serrated retaining teeth 68a that are connected in the circumferential direction for retaining the protrusion 66a of the second piston 66 are formed at intervals on the annular holder 68. The holder 68 is arranged in a fixed position on the input shaft 34. Also, receiving teeth 62d that have the same serrated shape as the retaining teeth 68a of the holder 68 but that are offset by half a phase in the circumferential direction, and that are connected in the circumferential direction and receive the protrusion 66a of the second piston 66, are formed at intervals on the annular first piston 62a. The annular first piston 62a is provided in a manner unable to rotate relative to the holder 68 but able to move in the rotational axis C1 direction, and moves the second piston 66 by one stroke amount of the first ball cam 50 against the urging force of the first spring 56. Stoppers 62e and 68b that stop the protrusion 66a from sliding are provided on inclined surfaces of the tip ends of the receiving teeth 62d of the first piston 62a and the retaining teeth 68a of the holder 68, respectively.

Figure 6A:
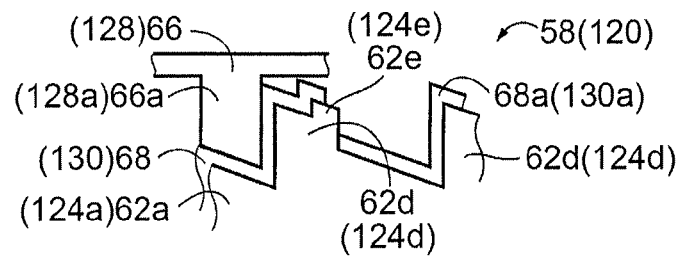
FIG. 6A is a view illustrating a catch/release mechanism provided in the transfer shown in FIG. 2, and a catch/release mechanism provided in the differential gear unit shown in FIG. 4.
Figure 6B:
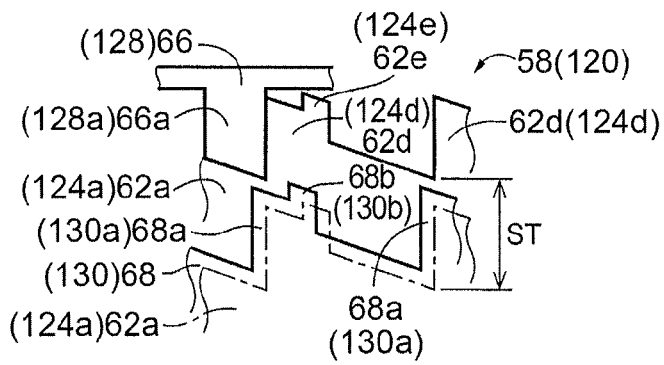
FIG. 6B is a view illustrating the catch/release mechanism provided in the transfer shown in FIG. 2, and the catch/release mechanism provided in the differential gear unit shown in FIG. 4.
Figure 6C:
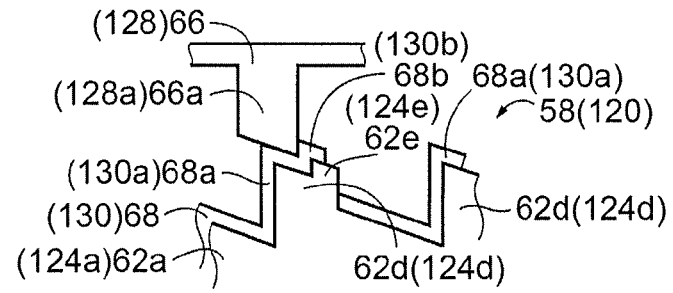
FIG. 6C is a view illustrating the catch/release mechanism provided in the transfer shown in FIG. 2, and the catch/release mechanism provided in the differential gear unit shown in FIG. 4.
Figure 6D:
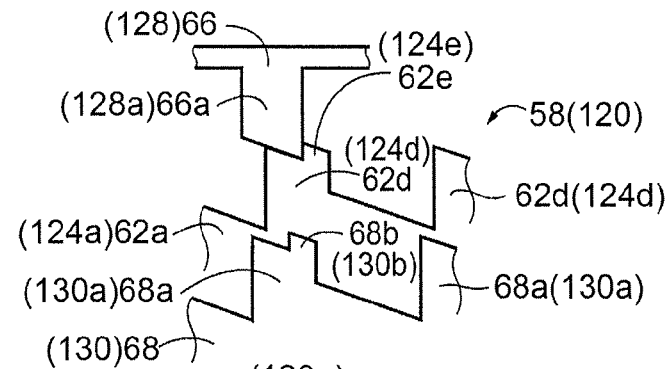
FIG. 6D is a view illustrating the catch/release mechanism provided in the transfer shown in FIG. 2, and the catch/release mechanism provided in the differential gear unit shown in FIG. 4.
Figure 6E:
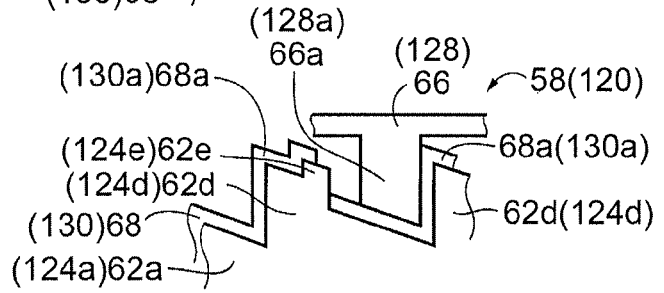
FIG. 6E is a view illustrating the catch/release mechanism provided in the transfer shown in FIG. 2, and the catch/release mechanism provided in the differential gear unit shown in FIG. 4.

FIGS. 6A and 6E are views of when the first movable sleeve 46 is in the first connect position. As shown in FIGS. 6A and 6E, when the protrusion 66a protruding from the second piston 66 is in a position where it is retained by the retaining teeth 68a of the holder 68, the first piston 62a is positioned in a base position. FIG. 6B is a view of a state in which the first piston 62a is moved from the base position against the urging force of the first spring 56 by a movement stroke ST amount by operation of the first actuator 54 and the first ball cam 50. In this process, the second piston 66 is moved away from the holder 68 by the first piston 62a, and the second piston 66 slips down the inclined surface of the first piston 62a. The alternate long and short dash line shown in FIG. 6B indicates the original position of the first piston 62a in FIG. 6A in order to illustrate the movement stroke ST. FIG. 6C is a view of a state in which the first piston 62a returns by the movement stroke ST amount with the urging force of the first spring 56 so as to be positioned in the base position, by the first actuator 54 and the first ball cam 50 not being operated. In this process, the second piston 66 is retained on the retaining teeth 68a of the holder 68, and is maintained in the first disconnect position. FIG. 6D is a view of a state in which the first piston 62a is again moved from the base position against the urging force of the first spring 56 by the movement stroke ST amount by operation of the first actuator 54 and the first ball cam 50. In this process, the second piston 66 is moved farther to the first spring 56 side, such that a friction engagement member 80 on the input shaft 34 side of a synchronizing device (synchronizing mechanism) 78 that will be described later frictionally engages with a friction engagement member 82 on the first ring gear 38 side, and the input shaft 34 and the first ring gear 38 rotate in synchronization. Next, when the first piston 62a returns by the movement stroke ST with the urging force of the first spring 56 so as to be positioned in the base position by the first actuator 54 and the first ball cam 50 not being operated, as shown in FIG. 6E, the second piston 66 is positioned in the first connect position, such that the first meshing teeth 38c of the first ring gear 38 and the first meshing teeth 46b of the first movable sleeve 46 intermesh.

As a result, with the first ratchet mechanism 58, the second piston 66 is sent in the circumferential direction with the reciprocating motion of the first piston 62a by the first ball cam 50, and the first movable sleeve 46 is moved toward the first disconnect position or the first connect position. When the second piston 66 moves back and forth once, the first movable sleeve 46 is positioned in the first disconnect position. Also, when the second piston 66 moves back and forth twice, i.e., when the first movable sleeve 46 is in the first disconnect position and the second piston 66 is then moved back and forth once, the second piston 66 is released from the retaining teeth 68a of the holder 68, and the first movable sleeve 46 is positioned in the first connect position by the urging force of the first spring 56.

As shown in FIG. 2, the transfer 26 is provided with the synchronizing device 78 that synchronizes the rotation of the first meshing teeth 46b of the first movable sleeve 46 with the rotation of the first meshing teeth 38c of the first ring gear 38 when the first movable sleeve 46 has moved as far toward the first disconnect position side as possible before moving to the first connect position. The first meshing teeth 46b of the first movable sleeve 46 are meshing teeth on the front wheel 14 side of the first mesh clutch 24, and the first meshing teeth 38c of the first ring gear 38 are meshing teeth on the propeller shaft 28 side of the first mesh clutch 24. Also, the synchronizing device 78 is arranged between the first movable sleeve 46 and the first ratchet mechanism 58 on the inner diameter side of the cylindrical first ring gear 38.

As shown in FIG. 2, the synchronizing device 78 includes the friction engagement member 80 on the cylindrical input shaft 34 side and the friction engagement member 82 on the first ring gear 38 side. The friction engagement member 80 is provided in a manner unable to rotate relative to the input shaft 34 but able to move in the rotational axis C1 direction on the cylindrical input shaft 34 via the first movable sleeve 46. The friction engagement member 82 is provided in a manner unable to rotate relative to the first ring gear 38 but able to move together with the first movable sleeve 46 in the rotational axis C1 direction. The friction engagement member 82 on the first ring gear 38 side has external meshing teeth 82a, a conical outer peripheral friction surface 82b, and a conical inner peripheral abutting surface 82c. The external meshing teeth 82a mesh with internal spline teeth 38e formed on an inner peripheral surface of the shaft portion 38a of the first ring gear 38, in a manner unable to rotate relative to the internal spline teeth 38e but able to move in the rotational axis C1 direction. The conical outer peripheral friction surface 82b is able to slidably contact a conical inner peripheral friction surface 80a that is formed on an inner peripheral surface of the friction engagement member 80 on the input shaft 34 side and is slightly inclined with respect to the rotational axis C1. The conical inner peripheral abutting surface 82c abuts against a conical outer peripheral abutting surface 84a that is formed on an outer peripheral surface of an annular member 84 interposed between the first movable sleeve 46 and the second piston 66, and that is slightly inclined with respect to the rotational axis C1. Therefore, the friction engagement member 82 on the first ring gear 38 side moves together with the first movable sleeve 46 in the rotational axis C1 direction by the end portion on the front wheel 14R side of the first movable sleeve 46 abutting against the end portion on the front wheel 14L side of the friction engagement member 82 on the first ring gear 38 side, and the conical outer peripheral abutting surface 84a of the annular member 84 abutting against the conical inner peripheral abutting surface 82c of the friction engagement member 82 on the first ring gear 38 side. Also, internal meshing teeth 84b that mesh with the second external spline teeth 34b of the input shaft 34, in a manner unable to rotate relative to the second external spline teeth 34b but able to move in the rotational axis C1 direction, are formed on the inner peripheral surface of the annular member 84.

Also, as shown in FIG. 2, the friction engagement member 80 on the input shaft 34 side has the conical inner peripheral friction surface 80a described above, internal meshing teeth 80b, and a conical outer peripheral abutting surface 80c. The internal meshing teeth 80b mesh with the external spline teeth 46c formed on an outer peripheral surface of the first movable sleeve 46, in a manner able to move in the rotational axis C1 direction with respect to the first movable sleeve 46 but unable to rotate relative to the first movable sleeve 46 around the rotational axis C1. The conical outer peripheral abutting surface 80c is able to abut against a conical inner peripheral abutting surface 38d that is formed on an inner peripheral surface of the end portion on the front wheel 14L side of the shaft portion 38a of the first ring gear 38 and is slightly inclined with respect to the rotational axis C1.

Therefore, when the first movable sleeve 46 switches from the first disconnect position to the first connect position via the annular member 84 and the first ratchet mechanism 58, the conical outer peripheral abutting surface 80c of the friction engagement member 80 on the input shaft 34 side abuts against the conical inner peripheral abutting surface 38d of the first ring gear 38, and the conical outer peripheral friction surface 82b of the friction engagement member 82 on the first ring gear 38 side is pushed against the conical inner peripheral friction surface 80a of the friction engagement member 80 on the input shaft 34 side, before the first meshing teeth 38c of the first ring gear 38 mesh with the first meshing teeth 46b of the first movable sleeve 46. As a result, the rotation of the first ring gear 38 that engages with the friction engagement member 82 on the first ring gear 38 side in a manner unable to rotate relative to the friction engagement member 82, is synchronized with the rotation of the input shaft 34 that engages with the friction engagement member 80 on the input shaft 34 side via the first movable sleeve 46 in a manner unable to rotate relative to the friction engagement member 80.

Also, as shown in FIG. 1, a coupling 86 is provided on the other end portion of the propeller shaft 28. This coupling 86 is provided between the propeller shaft 28 and a drive pinion 88 that will be described later, and transmits torque between one rotating element 86a and another rotating element 86b. Also, the coupling 86 is an electronically controlled coupling formed by a wet type multiple disc clutch, for example, and is able to continuously change the torque distribution to the front and rear wheels between 100:0 and 50:50, by controlling the transfer torque of the coupling 86.

Figure 3:
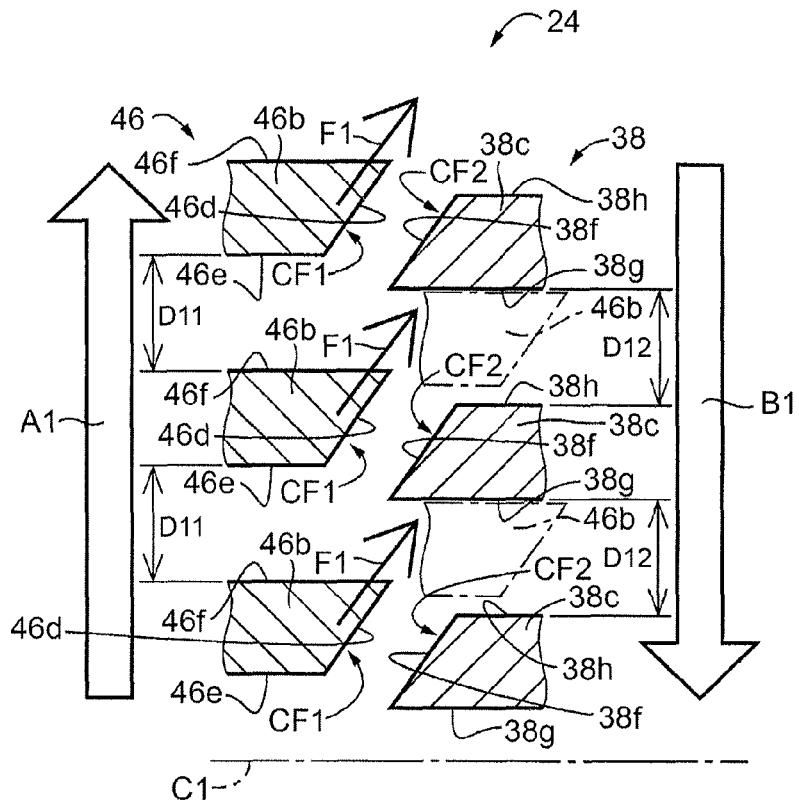
FIG. 3 is a sectional view taken along line III-III in FIG. 2, showing meshing teeth of a first mesh clutch provided in the transfer in FIG. 2.

FIG. 3 is a view showing a state in which the first meshing teeth 46b of the first movable sleeve 46 and the first meshing teeth 38c of the first ring gear 38 are substantially synchronized by the synchronizing device 78, and the first meshing teeth 46b of the first movable sleeve 46 and the first meshing teeth 38c of the first ring gear 38 are intermeshed, when a disconnected state in which the first mesh clutch 24 and the second mesh clutch 32 are released, i.e., the power transmitting path between the engine 12 and the propeller shaft 28 and the power transmitting path between the rear wheels 16 and the propeller shaft 28 are both disconnected, is canceled from a state in which the disconnected state is established. FIG. 3 is a view of when the 4WD vehicle 10 is traveling forward.

The first meshing teeth 46b of the first movable sleeve 46 are formed in a plurality on the outer peripheral portion of the cylindrical first movable sleeve 46, as shown in FIGS. 2 and 3. Also, the plurality of first meshing teeth 46b formed on the first movable sleeve 46 are each formed elongated in the rotational axis C1 direction, and formed such that a distance D11 between each of the first meshing teeth 46b is constant in the circumferential direction of the first movable sleeve 46. This distance D11 is set such that the plurality of first meshing teeth 46b formed on the first movable sleeve 46 fit in between the plurality of first meshing teeth 38c formed on the first ring gear 38.

As shown in FIG. 3, the first meshing teeth 46b of the first movable sleeve 46 rotate in the direction of arrow A1 around the rotational axis C1 with respect to the first meshing teeth 38c of the first ring gear 38, and move toward the first meshing teeth 38c side of the first ring gear 38 in the rotational axis C1 direction by the first moving mechanism 48, when the disconnected state is canceled. That is, the first meshing teeth 46b of the first movable sleeve 46 move in the direction of arrow F1 relative to the first meshing teeth 38c of the first ring gear 38 when the disconnected state is canceled. Also, a chamfered portion, i.e., a one-sided chamfer CF1, that inclines in one direction along the entire tooth width of each of the first meshing teeth 46b is provided on an end surface of each of the first meshing teeth 46b that is on the first meshing teeth 38c side and that is an abutting surface that abuts against the first meshing teeth 38c. Also, by providing the one-sided chamfer CF1 on the first meshing teeth 46b of the first movable sleeve 46, a first inclined surface (slope) 46d that is inclined such that a length in the rotational axis C1 direction of the first meshing teeth 46b increases in the direction of arrow A1 that is the direction in which the first meshing teeth 46b rotate when the 4WD vehicle 10 is traveling forward, is formed on the end surface of each of the first meshing teeth 46b that is on the first meshing teeth 38c side and that is an abutting surface that abuts against the first meshing teeth 38c. That is, the one-sided chamfer CF1 that is inclined such that the length of the first meshing teeth 46b in the rotational axis C1 direction increases in the direction of arrow A1, is formed on each of the plurality of first movable sleeve 46 formed on the first movable sleeve 46, when the 4WD vehicle 10 is traveling forward. Parallel surfaces 46e and 46f that are generally parallel to the rotational axis C1 are formed one on each side, in the direction of arrow A1, of each of the plurality of first meshing teeth 46b that are formed on the first movable sleeve 46.

The first meshing teeth 38c of the first ring gear 38 are formed in a plurality on the side surface 38b of the cylindrical shaft portion 38a of the first ring gear 38, as shown in FIGS. 2 and 3. Also, the plurality of first meshing teeth 38c formed on the first ring gear 38 are each formed elongated in the rotational axis C1 direction, and formed such that a distance D12 between each of the first meshing teeth 38c is constant in the circumferential direction of the shaft portion 38a of the first ring gear 38. This distance D12 is set such that the plurality of first meshing teeth 46b formed on the first movable sleeve 46 fit in between the plurality of first meshing teeth 38c formed on the first ring gear 38.

When the disconnected state is canceled, the first meshing teeth 38c of the first ring gear 38 rotate in the same direction as the first meshing teeth 46b of the first movable sleeve 46, i.e., in the direction of arrow A1, by the synchronizing device 78, and rotate in the direction of arrow B1 around the rotational axis C1 relative to the first meshing teeth 46b. While the 4WD vehicle 10 is traveling forward, the friction engagement member 82 on the first ring gear 38 side is pushed against the friction engagement member 80 on the input shaft 34 side by the synchronizing device 78, and the rotation speed of the first meshing teeth 38c of the first ring gear 38 increases so as to approach the rotation speed of the first meshing teeth 46b of the first movable sleeve 46 from a state in which the first meshing teeth 38c of the first ring gear 38 were substantially stopped together with the propeller shaft 28. Then, when the first movable sleeve 46 is moved from the first disconnect position to the first connect position, the force pushing the friction engagement member 82 on the first ring gear 38 side against the friction engagement member 80 on the input shaft 34 side decreases, and the rotation speed of the first meshing teeth 38c of the first ring gear 38 decreases due to the rotational resistance of the propeller shaft 28 and the like, for example. As a result, when the disconnected state is canceled and the four-wheel-drive state is established, the rotation speed of the first meshing teeth 38c of the first ring gear 38 becomes slower than the rotation speed of the first meshing teeth 46b of the first movable sleeve 46.

A chamfered portion, i.e., a one-sided chamfer CF2, that inclines in one direction along the entire tooth width of each of the first meshing teeth 38c is provided on an end surface of each of the first meshing teeth 38c that is on the first meshing teeth 46b side and that is an abutting surface that abuts against the first meshing teeth 46b. Also, by providing the one-sided chamfer CF2 on the first meshing teeth 38c of the first ring gear 38, a first inclined surface (slope) 38f that is inclined such that a length in the rotational axis C1 direction of the first meshing teeth 38c decreases in the direction of arrow A1, is formed on the end surface of each of the first meshing teeth 38c that is on the first meshing teeth 46b side and that is an abutting surface that abuts against the first meshing teeth 46b. That is, the one-sided chamfer CF2 that is inclined such that the length of the first meshing teeth 38c in the rotational axis C1 direction decreases in the direction of arrow A1, is formed on each of the plurality of first meshing teeth 38c formed on the first ring gear 38, when the 4WD vehicle 10 is traveling forward. Parallel surfaces 38g and 38h that are generally parallel to the rotational axis C1 are formed one on each side, in the direction of arrow A1, of each of the plurality of first meshing teeth 38c that are formed on the first ring gear 38.

With the transfer 26 structured as described above, when the disconnected state is canceled, the rotation speed of the first meshing teeth 38c of the first ring gear 38 is increased to the rotation speed of the first meshing teeth 46b of the first movable sleeve 46 and rotation of the meshing teeth in the first mesh clutch 24 is substantially synchronized by the synchronizing device 78, and the first meshing teeth 46b of the first movable sleeve 46 are moved toward the first ring gear 38 side in the rotational axis C1 direction by the first moving mechanism 48. As a result, the first inclined surface 46d of the first movable sleeve 46 abuts against the first inclined surface 38f of the first ring gear 38, and following this first inclined surface 38f, the plurality of first meshing teeth 46b formed on the first movable sleeve 46 fit in between the plurality of first meshing teeth 38c formed on the first ring gear 38. That is, the first meshing teeth 46b of the first movable sleeve 46 intermesh with the first meshing teeth 38c of the first ring gear 38, such that the first mesh clutch 24 engages. Also, when the first meshing teeth 46b of the first movable sleeve 46 fit in between the first meshing teeth 38c of the first ring gear 38, the rotation speed of the first meshing teeth 38c relatively decreases with respect to the first meshing teeth 46b due to the rotational resistance of the propeller shaft 28 and the like, so the parallel surface 46f formed on the side where the length of the first meshing teeth 46b in the rotational axis C1 direction is longer corresponds to the parallel surface 38g formed on the side where the length of the first meshing teeth 38c in the rotational axis C1 direction is longer. If a mountain-shaped chamfer, i.e., a double-sided chamfer, were provided instead of the one-sided chambers CF1 and CF2 on the first meshing teeth 38c and 46b of the first ring gear 38 and the first movable sleeve 46, respectively, then when the first meshing teeth 46b of the first movable sleeve 46 fit in between the first meshing teeth 38c of the first ring gear 38, the rotation speed of the first meshing teeth 38c would relatively decrease with respect to the first meshing teeth 46b due to the rotational resistance of the propeller shaft 28 and the like, so an inclined surface that inclines with respect to the rotational axis C1 and is formed on the first meshing teeth 46b of the first movable sleeve 46 by providing the double-sided chamfer would correspond to an inclined surface that inclines with respect to the rotational axis C1 and is formed on the first meshing teeth 38c of the first ring gear 38 by providing the double-sided chamber. Therefore, a component force that tries to separate the first meshing teeth 38c and 46b in the rotational axis C1 direction acts by the abutment of these inclined surfaces, and tooth jump may consequently occur. However, when the one-sided chamfers CF1 and CF2 are provided on the first meshing teeth 38c and first meshing teeth 46b, respectively, as in this example embodiment, the first meshing teeth 38c and the first meshing teeth 46b abut at the parallel surfaces 38g and 46f that are parallel to the rotational axis C1, so a component force that tries to separate the first meshing teeth 38c and 46b in the rotational axis C1 direction is not generated, and movement of the first meshing teeth 46b in the rotational axis C1 direction toward the first meshing teeth 38c is no longer impeded. Also, in the transfer 26, when the 4WD vehicle 10 is traveling in reverse, the first mesh clutch 24 is controlled by an electronic control unit to prohibit the disconnected state from being canceled. The rotational direction of the differential rotation of the first meshing teeth 38c and 46b of the first mesh clutch 24 when the 4WD vehicle 10 is traveling forward is the opposite direction, e.g., the rotation of the first meshing teeth 46b of the first movable sleeve 46 is the opposite direction of the direction of the arrow A1, when the 4WD vehicle 10 is traveling in reverse, so when the disconnected state is canceled and the first inclined surface 46d of the first meshing teeth 46b of the first movable sleeve 46 abuts against the first inclined surface 38f of the first meshing teeth 38c of the first ring gear 38, these first meshing teeth 38c and 46b tend to jump.

Figure 4:
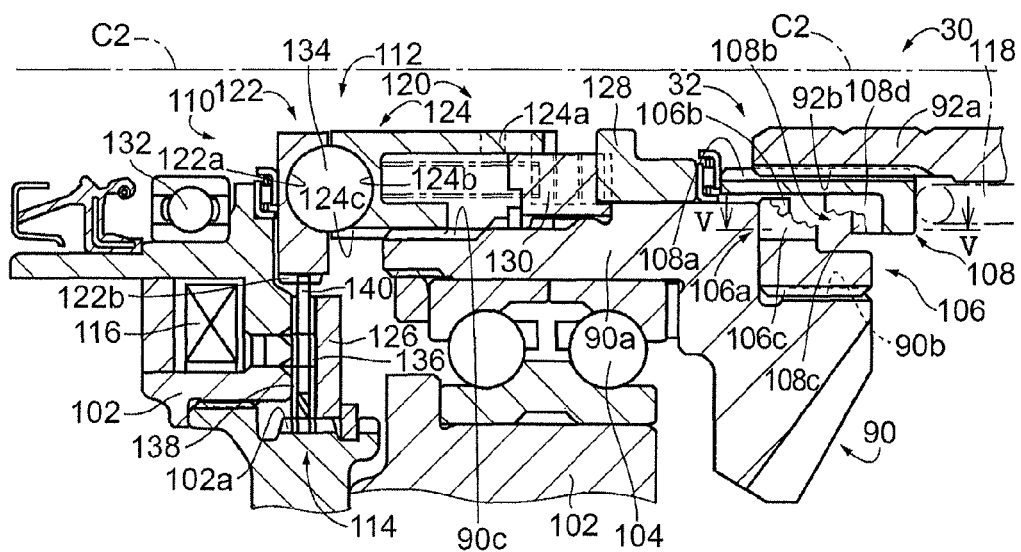
FIG. 4 is a sectional view of the structure of a differential gear unit provided in the four-wheel-drive vehicle in FIG. 1.

As shown in FIGS. 1 and 4, the rear wheel differential gear unit 30 includes the second mesh clutch 32 and a differential gear unit 94. The second mesh clutch 32 engages/disengages the propeller shaft 28 to/from the left and right rear wheels 16L and 16R, i.e., a second ring gear 90 that non-rotatably meshes with the drive pinion 88 and a differential case 92, in the power transmitting path from the propeller shaft 28 to the left and right rear wheels 16L and 16R. The differential gear unit 94 distributes driving force transmitted from the engine 12 to the differential case 92 to the left and right rear wheels 16L and 16R while allowing differential rotation, while the second mesh clutch 32 is engaged. The differential gear unit 94 includes the differential case 92 that is rotatably supported around a rotational axis C2, a pair of side gears 98 that are supported by the differential case 92 in a state facing each other inside the differential case 92 and in a manner rotatable around the rotational axis C2, and a pair of pinions 100 that are supported by the differential case 92 in a manner rotatable around a rotational axis C3 that is orthogonal to the rotational axis C2. Also, the differential gear unit 94 is well-known technology, so a description of the specific structure and operation will be omitted.

The second ring gear 90 is a bevel gear on which a hypoid gear is formed, for example, with a shaft portion 90a that protrudes in a generally cylindrical shape is formed on the rear wheel 16L side from an inner peripheral portion of the second ring gear 90, as shown in FIG. 4. Also, the cylindrical second ring gear 90 is rotatably supported in a cantilevered manner around the rotational axis C2 by the shaft portion 90a being supported by a bearing 104 provided in a second unit case 102. The differential case 92 has a cylindrical shaft 92a that protrudes in a generally cylindrical shape from the differential case 92 toward the rear wheel 16L side, i.e., the inside of the cylindrical second ring gear 90, and a tip end portion of this cylindrical shaft 92a is arranged inside of the cylindrical second ring gear 90, as shown in FIGS. 1 and 4. Also, the cylindrical shaft 92a of the differential case 92 is supported so as to be able to rotate around the rotational axis C2, i.e., so as to be able to rotate concentrically with the second ring gear 90, by the differential case 92 being supported by bearings, not shown, provided in the second unit case 102.

The second mesh clutch 32 is a connecting/disconnecting mechanism (a dog clutch) for connecting/disconnecting the power transmitting path between the rear wheels 16 and the propeller shaft 28, i.e., the power transmitting path between the second ring gear 90 and the differential case 92. The second mesh clutch 32 includes second meshing teeth (dog teeth) 106a and a cylindrical second movable sleeve 108. The second meshing teeth 106a are formed on an inner peripheral surface of a fixed engagement member 106 that is in mesh in a fixed position with internal meshing teeth 90b formed on an inner peripheral surface of the second ring gear 90. The cylindrical second movable sleeve 108 has internal spline teeth 108a that mesh with external spline teeth 92b of the cylindrical shaft 92a of the differential case 92 in a manner unable to rotate around the rotational axis C2 relative to the cylindrical shaft 92a but able to move in the rotational axis C2 direction, as well as second meshing teeth (dog teeth) 108b that can mesh with the second meshing teeth 106a of the fixed engagement member 106 by the second movable sleeve 108 moving in the rotational axis C2 direction. The second mesh clutch 32 is configured such that some of the driving force to be transmitted from the engine 12 to the left and right front wheels 14L and 14R is output via the propeller shaft 28 to the left and right rear wheels 16L and 16R, according to whether the second meshing teeth 106a of the fixed engagement member 106 that are integrally fixed to the second ring gear 90 and the second meshing teeth 108b that are integrally formed on the outer diameter side of the second movable sleeve 108 are in mesh or not in mesh.

The rear wheel differential gear unit 30 is provided with a second moving mechanism 110 that moves the second movable sleeve 108 in the rotational axis C2 direction, and moves the second movable sleeve 108 to a second connect position and a second disconnect position, as shown in FIG. 4. The second connect position is a position where the second movable sleeve 108 moves in the rotational axis C2 direction and the second meshing teeth 108b of the second movable sleeve 108 mesh with the second meshing teeth 106a of the fixed engagement member 106 that is integrally fixed to the second ring gear 90. In the second connect position, the second ring gear 90 is unable to rotate relative to the differential case 92. Also, the second disconnect position is a position where the second movable sleeve 108 moves in the rotational axis C2 direction and the second meshing teeth 108b of the second movable sleeve 108 do not mesh with the second meshing teeth 106a of the fixed engagement member 106 that is integrally fixed to the second ring gear 90. In the second disconnect position, the second ring gear 90 and the differential case 92 are able to rotate relative to each other.

The second moving mechanism 110 is provided with a second ball cam 112, a second auxiliary clutch 114, a second actuator 116, a second spring 118, and a second ratchet mechanism (catch/release mechanism) 120. The second actuator 116 is an electromagnetic coil that makes the second auxiliary clutch 114 generate rotation braking torque. The second actuator 116 is integrally fixed to the second unit case 102. The second ball cam 112 is a device that converts rotary force of the second ring gear 90 into thrust in the rotational axis C2 direction of the second ring gear 90 when rotation braking torque is generated in an annular second cage 122, described later, via the second auxiliary clutch 114 by the second actuator 116. The second ratchet mechanism 120 moves the second movable sleeve 108 and maintains the moving position of the second movable sleeve 108 with the thrust converted by the second ball cam 112. The second spring 118 is interposed between the second movable sleeve 108 and a main body case 92c (see FIG. 1) that houses a pair of side gears 98 and a pair of pinions 100 and the like of the differential case 92, on the cylindrical shaft 92a of the differential case 92, and urges the second movable sleeve 108 from the second disconnect position toward the second connect position. That is, the second spring 118 urges the second movable sleeve 108 toward the rear wheel 16L side in the rotational axis C2 direction. As a result, the second moving mechanism 110 applies rotation braking torque to the second cage 122 with the second actuator 116 and the second auxiliary clutch 114 to generate thrust in the rotational axis C2 direction in the second ball cam 112, and move the second movable sleeve 108 in the rotational axis C2 direction against the urging force of the second spring 118 via the second ratchet mechanism 120 with a first cage 124 that will be described later.

The second ratchet mechanism 120 includes an annular first piston 124a, an annular second piston 128, and an annular holder 130. The first piston 124a is moved in a reciprocating manner (back and forth) in the rotational axis C2 direction a predetermined stroke via the second ball cam 112 by an electromagnetic coil, i.e., the second actuator 116, attracting a disk-shaped movable piece 126. The second piston 128 is provided in a manner able to rotate relative to the second ring gear 90, and is moved in the rotational axis C2 direction against the urging force of the second spring 118 by the first piston 124a. The holder 130 has retaining teeth 130a (see FIGS. 6A to 6E), and is provided in a manner unable to rotate relative to the second ring gear 90 and unable to move in the rotational axis C2 direction, and retains the second piston 128 moved by the first piston 124a with the retaining teeth 130a. In the second ratchet mechanism 120, the second movable sleeve 108 is moved by the second piston 128 against the urging force of the second spring 118 toward the second disconnect position, by the first piston 124a being moved back and forth in the rotational axis C2 direction, and the second piston 128 is retained by the retaining teeth 130a of the holder 130. Then, when the first piston 124a is again moved back and forth in the rotational axis C2 direction, the second piston 128 is released from the retaining teeth 130a of the holder 130, and the second movable sleeve 108 moves toward the second connect position by the urging force of the second spring 118. As shown in FIG. 4, the first piston 124a of the second ratchet mechanism 120 is integrally provided on the first cage 124 of the second ball cam 112, and the second ratchet mechanism 120 is arranged between the second movable sleeve 108 and the second cage 122 of the second ball cam 112.

The second ball cam 112 has a pair of annular cages, i.e., the first cage 124 and the second cage 122, and a plurality of (e.g., three) spherical rolling elements 134, provided between the second piston 128 of the second ratchet mechanism 120 and a bearing 132. The pair of cages, i.e., the first cage 124 and the second cage 122, are interposed in a manner overlapping in the rotational axis C2 direction. The plurality of (e.g., three) spherical rolling elements 134 are provided in a plurality of locations (e.g., three locations) in the circumferential direction in the first cage 124 and the second cage 122, and are sandwiched by a pair of groove-shaped cam surfaces 124b and 122b that face each other and have depths that change in the circumferential direction. When the first cage 124 and the second cage 122 are rotated relative to each other, the first cage 124 and the second cage 122 move away from each other in the rotational axis C2 direction. As a result, when the first piston 124a is moved back and forth once toward the rear wheel 16R side and the rear wheel 16L side in the rotational axis C2 direction by the second ball cam 112, the second movable sleeve 108 moves toward the second disconnect position against the urging force of the second spring 118 via the second ratchet mechanism 120, as shown in the differential gear unit 30 on the lower below the rotational axis C2 shown in FIG. 4, i.e., on the side opposite the engine 12 side. Then, the second meshing teeth 108b of the second movable sleeve 108 come out of mesh with the second meshing teeth 106a of the fixed engagement member 106 that is integrally fixed to the second ring gear 90, such that the second mesh clutch 32 releases. Also, when the first piston 124a moves back and forth twice by the second ball cam 112, i.e., when the second movable sleeve 108 is placed in the second disconnect position, and then the first piston 124a moves back and forth once, although not shown, the second piston 128 is released from the retaining teeth 130a of the holder 130 and the second movable sleeve 108 moves to the second connect position by the urging force of the second spring 118. Then, the second meshing teeth 108b of the second movable sleeve 108 intermesh with the second meshing teeth 106a of the fixed engagement member 106 that is integrally fixed to the second ring gear 90, such that the second mesh clutch 32 engages.

Also, the second auxiliary clutch 114 that has a pair of disk-shaped first friction plates 136 and 138 and a disk-shaped second friction plate 140, is arranged between an electromagnetic coil, i.e., the second actuator 116, and the movable piece 126. As shown in detail in FIG. 4, the first friction plates 136 and 138 are arranged between the electromagnetic coil and the movable piece 126, and are engaged with internal spline teeth 102a formed on the second unit case 102, in a manner unable to rotate around the rotational axis C2 but able to move in the rotational axis C2 direction. The second friction plate 140 is arranged between the pair of first friction plates 136 and 138, and is engaged with external spline teeth 122b formed on the second cage 122, in a manner unable to rotate around the rotational axis C2 but able to move in the rotational axis C2 direction. Also, the groove-shaped cam surfaces 124b and 122a formed in a plurality of locations in the circumferential direction between the annular first cage 124 and the annular second cage 122 are inclined such that the distance in the rotational axis C2 direction between these cam surfaces 124b and 122a becomes shorter farther along in the circumferential direction. Also, external meshing teeth 124c that mesh with internal spline teeth 90c formed on the inner peripheral surface of the shaft portion 90a of the second ring gear 90, in a manner unable to rotate relative to the internal spline teeth 90c but able to move in the rotational axis C2 direction, are formed on the outer peripheral surface of the first cage 124.

With the electromagnetic coil, i.e., the second actuator 116, the second auxiliary clutch 114, and the second ball cam 112 structured as described above, when the movable piece 126 is attracted by the electromagnetic coil while the second ring gear 90 is rotating while the vehicle is running, for example, the pair of first friction plates 136 and 138 and the second friction plate 140 of the second auxiliary clutch 114 are squeezed between the movable piece 126 and the electromagnetic coil by the movable piece 126, such that rotation braking torque is transmitted to the second friction plate 140. That is, when the movable piece 126 is attracted by the electromagnetic coil, rotation braking torque is transmitted to the second cage 122 via the second friction plate 140 of the second auxiliary clutch 114. Therefore, the first cage 124 and the second cage 122 rotate relative to each other by the rotation braking torque, and the first piston 124a integrally formed on the first cage 124 moves toward the rear wheel 16R side against the urging force of the second spring 118 in the rotational axis C2 direction with respect to the second cage 122 via the spherical rolling elements 134, such that the rotary force of the second ring gear 90 is converted into thrust in the rotational axis C2 direction. Also, when the movable piece 126 is not being attracted to the electromagnetic coil, the second cage 122 is able to rotate relative to the second unit case 102, so the second cage 122 is brought around with the first cage 124 via the spherical rolling elements 134, and the second cage 122 and the first cage 124 rotate together. As a result, the first piston 124a stops moving back and forth in the rotational axis C2 direction.

As described above, the second ratchet mechanism 120 functions as a retaining mechanism, i.e., has the same function as the first ratchet mechanism 58 described above, and includes the annular first piston 124a, the annular second piston 128, and the annular holder 130. Therefore, in this example embodiment, the operating principle of the second ratchet mechanism 120 will be described with reference to FIGS. 6A to 6E used to illustrate the operating principle of the first ratchet mechanism 58 described above. As shown in FIGS. 6A to 6E, a protrusion 128a that protrudes on the holder 130 side is formed on the annular second piston 128. Also, the serrated retaining teeth 130a that are connected in the circumferential direction for retaining the protrusion 128a of the second piston 128 are formed at intervals on the annular holder 130. The holder 130 is arranged in a fixed position on the second ring gear 90. Also, receiving teeth 124d that have the same serrated shape as the retaining teeth 130a of the holder 130 but that are offset by half a phase in the circumferential direction, and that are connected in the circumferential direction and receive the protrusion 128a of the second piston 128, are formed at intervals on the annular first piston 124a. The annular first piston 124a is provided in a manner unable to rotate relative to the holder 130 but able to move in the rotational axis C2 direction, and moves the second piston 128 by one stroke amount of the second ball cam 112 against the urging force of the second spring 118. Stoppers 124e and 130b that stop the protrusion 128a from sliding are provided on inclined surfaces of the tip ends of the receiving teeth 124d of the first piston 124a and the retaining teeth 130a of the holder 130, respectively.

FIGS. 6A and 6E are views of when the second movable sleeve 108 is in the second connect position. As shown in FIGS. 6A and 6E, when the protrusion 128a protruding from the second piston 128 is in a position where it is retained by the retaining teeth 130a of the holder 68, the first piston 124a is positioned in a base position. FIG. 6B is a view of a state in which the first piston 124a is moved from the base position against the urging force of the second spring 118 by a movement stroke ST amount by operation of the second actuator 116 and the second ball cam 112. In this process, the second piston 128 is moved away from the holder 130 by the first piston 124a, and the second piston 128 slips down the inclined surface of the first piston 124a. The alternate long and short dash line shown in FIG. 6B indicates the original position of the first piston 124a in FIG. 6A in order to illustrate the movement stroke ST. FIG. 6C is a view of a state in which the first piston 124a returns by the movement stroke ST amount with the urging force of the second spring 118 so as to be positioned in the base position, by the second actuator 116 and the second ball cam 112 not being operated. In this process, the second piston 128 is retained on the retaining teeth 130a of the holder 130, and is maintained in the second disconnect position. FIG. 6D is a view of a state in which the first piston 124a is again moved from the base position against the urging force of the second spring 118 by the movement stroke ST amount by operation of the second actuator 116 and the second ball cam 112. In this process, the second piston 128 is moved farther to the second spring 118 side. Next, when the first piston 124a returns by the movement stroke ST with the urging force of the second spring 118 so as to be positioned in the base position by the second actuator 116 and the second ball cam 112 not being operated, as shown in FIG. 6E, the second piston 128 is positioned in the second connect position, such that the second meshing teeth 106a of the fixed engagement member 106 that is integrally fixed to the second ring gear 90, and the second meshing teeth 108b of the second movable sleeve 108, intermesh.

As a result, with the second ratchet mechanism 120, the second piston 128 is sent in the circumferential direction with the reciprocating motion of the first piston 124a by the second ball cam 112, and the second movable sleeve 108 is moved toward the second disconnect position or the second connect position. When the second piston 128 moves back and forth once, the second movable sleeve 108 is positioned in the second disconnect position. Also, when the second piston 128 moves back and forth twice, i.e., when the second movable sleeve 108 is in the second disconnect position and the second piston 128 is then moved back and forth once, the second piston 128 is released from the retaining teeth 130a of the holder 130, and the second movable sleeve 108 is positioned in the second connect position by the urging force of the second spring 118.

Figure 5:
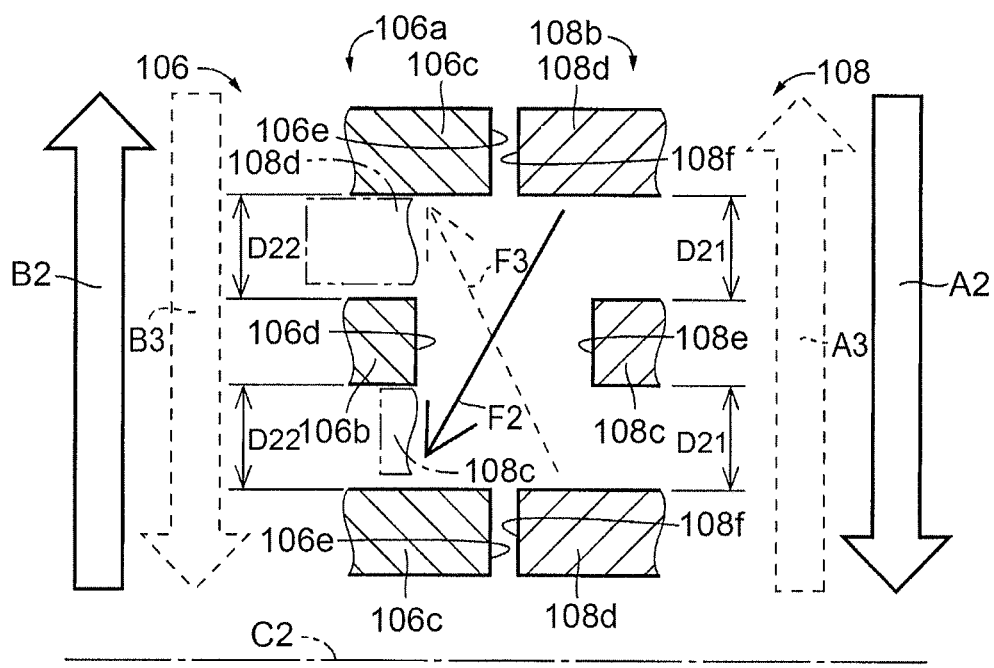
FIG. 5 is a sectional view taken along line V-V in FIG. 4, showing meshing teeth of a second mesh clutch provided in the differential gear unit in FIG. 4.

FIG. 5 is a view of a state in which the second meshing teeth 106a of the fixed engagement member 106 that is integrally fixed to the second ring gear 90 and the second meshing teeth 108b of the second movable sleeve 108 after the first mesh clutch 24 of the transfer 26 is engaged are intermeshed when the disconnected state is canceled.

The second meshing teeth 108b of the second movable sleeve 108 are formed in a plurality on an outer peripheral surface of the cylindrical second movable sleeve 108, as shown in FIGS. 4 and 5. Also, the plurality of second meshing teeth 108b formed on the second movable sleeve 108 are each formed elongated in the rotational axis C2 direction, and formed such that a distance D21 between each of the second meshing teeth 108b is constant in the circumferential direction of the second movable sleeve 108. This distance D21 is set such that the plurality of second meshing teeth 108b formed on the second movable sleeve 108 fit in between the plurality of second meshing teeth 106a formed on the fixed engagement member 106.

As shown in FIG. 5, the second meshing teeth 108b of the second movable sleeve 108 rotate in the same direction as the second meshing teeth 106a of the fixed engagement member 106, i.e., in the direction of arrow B2, but rotate in the direction of arrow A2 around the rotational axis C2 relative to the second meshing teeth 106a, and move toward the second meshing teeth 106a side of the fixed engagement member 106 in the rotational axis C2 direction by the second moving mechanism 110, when the disconnected state is canceled. That is, the second meshing teeth 108b of the second movable sleeve 108 move in the direction of arrow F2 relative to the second meshing teeth 106a of the fixed engagement member 106 when the disconnected state is canceled. The directions of arrow A2, arrow F2, and arrow B2 indicated by the solid lines in FIG. 5 show a state when the rotation speed of the left and right wheel axles 22L and 22R of the front wheels 14 is faster than the rotation speed of wheel axles 96L and 96R of the rear wheels 16, when the 4WD vehicle 10 is traveling forward. In the FF-based 4WD vehicle 10 of this example embodiment, the rotation speed of the left and right wheel axles 22L and 22R of the front wheels 14 is basically faster than the rotation speed of the wheel axles 96L and 96R of the rear wheels 16 due to the slip ratio between the main and auxiliary driving wheels and the dynamic loaded radius of the tires due to the vehicle weight. Also, if for some reason, e.g., due to tire rotation, the rotation speed of the wheel axles 96L and 96R of the rear wheels 16 becomes faster than the rotation speed of the left and right wheel axles 22L and 22R of the front wheels 14, the second meshing teeth 108b of the second movable sleeve 108 will rotate in the direction of arrow A3 around the rotational axis C2 relative to the second meshing teeth 106a of the fixed engagement member 106 and move relative to the second meshing teeth 106a in the direction of arrow F3, and the second meshing teeth 106a of the fixed engagement member 106 that is integrally fixed to the second ring gear 90 will move in the direction of arrow B3 around the rotational axis C2 relative to the second meshing teeth 108b of the second movable sleeve 108, as shown by the broken lines in FIG. 5.

Also, as shown in FIG. 5, the plurality of second meshing teeth 108b formed on the second movable sleeve 108 each have a short tooth (meshing tooth) 108c of which the length dimension in the rotational axis C2 direction is relatively short, and a long tooth (meshing tooth) 108d of which the length dimension in the rotational axis C2 direction is longer than the length dimension of the short tooth 108c in the rotational axis C2 direction. The short tooth 108c and the long tooth 108d are arranged alternately in the circumferential direction of the cylindrical second movable sleeve 108, e.g., a direction in which the second meshing teeth 108b rotates relative to the second meshing teeth 106a when the 4WD vehicle 10 is traveling forward, i.e., the direction of arrow A2. The plurality of short teeth 108c and long teeth 108d that make up the second meshing teeth 108b formed on the second movable sleeve 108 are arranged such that an end portion of the each of the short teeth 108c that is on the second meshing teeth 106a side of the fixed engagement member 106 is positioned farther away from the second meshing teeth 106a of the fixed engagement member 106 in the rotational axis C2 direction than the end portion of each of the long teeth 108d that is on the second meshing teeth 106a side of the fixed engagement member 106. An end surface of the short teeth 108c that is on a short tooth 106b side and that is an abutting surface that abuts against the short teeth 106b, is formed flat such that the length in the rotational axis C2 direction of the short teeth 108c of the second meshing teeth 108b does not change in the direction in which the second meshing teeth 108b rotate relative to the second meshing teeth 106a when the 4WD vehicle 10 is traveling forward, i.e., in the direction of arrow A2. That is, the end surface of the short teeth 108c that is on the short tooth 106b side and that is an abutting surface that abuts against the short teeth 106b, is formed in a flat shape having a flat surface 108e on a plane orthogonal to the rotational axis C2. Also, an end surface of the long teeth 108d that is on a long tooth 106c side and that is an abutting surface that abuts against the long teeth 106c, is formed flat such that the length in the rotational axis C2 direction of the long teeth 108d of the second meshing teeth 108b does not change in the direction of arrow A2. That is, the end surface of the long teeth 108d that is on the long tooth 106c side and that is an abutting surface that abuts against the long teeth 106c, is formed in a flat shape having a flat surface 108f on a plane orthogonal to the rotational axis C2. The second meshing teeth 108b of the second movable sleeve 108 are meshing teeth on the rear wheel 16 side of the second mesh clutch 32.

The second meshing teeth 106a of the fixed engagement member 106 that is fixed to the second ring gear 90 are formed in a plurality on an inner peripheral surface of the cylindrical fixed engagement member 106, as shown in FIGS. 4 and 5. Also, the plurality of second meshing teeth 106a formed on the fixed engagement member 106 are each formed elongated in the rotational axis C2 direction, and formed such that a distance D22 between each of the second meshing teeth 106a is constant in the circumferential direction of the fixed engagement member 106. This distance D22 is set such that the plurality of second meshing teeth 108b formed on the second movable sleeve 108 fit in between the plurality of second meshing teeth 106a formed on the fixed engagement member 106.

As shown in FIG. 5, the second meshing teeth 106a of the fixed engagement member 106 that is fixed to the second ring gear 90 rotate in the same direction as the second meshing teeth 108b of the second movable sleeve 108, i.e., the direction of arrow B2, when the disconnected state is canceled. Also, the plurality of second meshing teeth 106a formed on the fixed engagement member 106 each have a short tooth (meshing tooth) 106b of which the length dimension in the rotational axis C2 direction is relatively short, and a long tooth (meshing tooth) 106c of which the length dimension in the rotational axis C2 direction is longer than the length dimension of the short tooth 106b in the rotational axis C2 direction. The short tooth 106b and the long tooth 106c are arranged alternately in the circumferential direction of the cylindrical fixed engagement member 106, i.e., the direction of arrow A2. The plurality of short teeth 106b and long teeth 106c that make up the second meshing teeth 106a formed on the fixed engagement member 106 are arranged such that an end portion of the each of the short teeth 106b that is on the second meshing teeth 108b side of the second movable sleeve 108 is positioned farther away from the second meshing teeth 108b of the second movable sleeve 108 in the rotational axis C2 direction than the end portion of each of the long teeth 106c that is on the second meshing teeth 108b side of the second movable sleeve 108. An end surface of the short teeth 106b that is on a short tooth 108c side and that is an abutting surface that abuts against the short teeth 108c, is formed flat with no change in length in the rotational axis C2 direction of the short teeth 106b of the second meshing teeth 106a, in the direction of arrow A2. That is, the end surface of the short teeth 106b that is on the short tooth 108c side and that is an abutting surface that abuts against the short teeth 108c is formed in a flat shape with a flat surface 106d on a plane orthogonal to the rotational axis C2. Also, an end surface of the long teeth 106c that is on a long tooth 108d side and that is an abutting surface that abuts against the long teeth 108d, is formed flat with no change in length in the rotational axis C2 direction of the long teeth 106c of the second meshing teeth 106a, in the direction of arrow A2. That is, the end surface of the long teeth 106c that is on the long tooth 108d side and that is an abutting surface that abuts against the long teeth 108*d* is formed in a flat shape with a flat surface 106*e* on a plane orthogonal to the rotational axis C2. The second meshing teeth 106*a* of the fixed engagement member 106 are meshing teeth on the propeller shaft 28 side of the second mesh clutch 32.

With the differential gear unit 30 structured as described above, when the disconnected state is canceled while the 4WD vehicle 10 is traveling forward, the second meshing teeth 108*b* of the second movable sleeve 108 are moved toward the second meshing teeth 106*a* side of the fixed engagement member 106 in the rotational axis C2 direction by the second moving mechanism 110, while differential rotation of the second meshing teeth 106*a* and 108*b* of the second mesh clutch 32 is rotation in the direction of arrow A2, i.e., while the second meshing teeth 108*b* of the second movable sleeve 108 is rotating relative to the second meshing teeth 106*a* of the fixed engagement member 106 in the direction of arrow A2, after the first mesh clutch 24 of the transfer 26 is engaged. As a result, for example, the flat surfaces 108*f* of the long teeth 108*d* of the second movable sleeve 108 abut against the flat surfaces 106*e* of the long teeth 106*c* of the fixed engagement member 106, and the long teeth 108*d* of the second movable sleeve 108 rotate relative to the long teeth 106*c* of the fixed engagement member 106 in the direction of arrow A2, and the long teeth 108*d* of the second movable sleeve 108 fit in between the long teeth 106*c* of the fixed engagement member 106, i.e., fit in between the long teeth 106*c* and the short teeth 106*b* of the fixed engagement member 106. That is, the long teeth 108*d* of the second movable sleeve 108 move relative to the long teeth 106*c* of the fixed engagement member 106 in the direction of arrow F2, and fit in between the long teeth 106*c* and the short teeth 106*b* of the fixed engagement member 106. As a result, the second meshing teeth 108*b* of the second movable sleeve 108 intermesh with the second meshing teeth 106*a* of the fixed engagement member 106, such that the second mesh clutch 32 engages.

Also, after the first mesh clutch 24 of the transfer 26 is engaged, when the differential rotation of the second meshing teeth 106*a* and 108*b* of the second mesh clutch 32 is rotation in the opposite direction of the direction of arrow A2, i.e., when the second meshing teeth 108*b* of the second movable sleeve 108 are rotating in the direction of arrow A3 relative to the second meshing teeth 106*a* of the fixed engagement member 106, for example, the flat surface 108*f* of the long teeth 108*d* of the second movable sleeve 108 abuts against the flat surface 106*e* of the long teeth 106*c* of the fixed engagement member 106, and the long teeth 108*d* of the second movable sleeve 108 rotate relative to the long teeth 106*c* of the fixed engagement member 106 in the direction of arrow A3, and the long teeth 108*d* of the second movable sleeve 108 fit in between the long teeth 106*c* of the fixed engagement member 106, i.e., fit in between the long teeth 106*c* and the short teeth 106*b* of the fixed engagement member 106. That is, the long teeth 108*d* of the second movable sleeve 108 move relative to the long teeth 106*c* of the fixed engagement member 106 in the direction of arrow F3, and fit in between the long teeth 106*c* and the short teeth 106*b* of the fixed engagement member 106.

With the 4WD vehicle 10 structured as described above, for example, when a 2WD running mode is selected by an electronic control unit while in the 4WD state in which the first mesh clutch 24 and the second mesh clutch 32 are both engaged, the first movable sleeve 46 is moved to the first disconnect position by the first moving mechanism 48 in the transfer 26 such that the first mesh clutch 24 is released, the second movable sleeve 108 is moved to the second disconnect position by the second moving mechanism 110 in the rear wheel differential gear unit 30 such that the second mesh clutch 32 is released. As a result, a disconnected state is established in which the power transmitting path between the engine 12 and the propeller shaft 28, and the power transmitting path between the rear wheels 16 that are the auxiliary driving wheels and the propeller shaft 28 are both disconnected. Also, from this disconnected state, when the 4WD running mode is selected by the electronic control unit, rotation of the first meshing teeth 38*c* and rotation of the first meshing teeth 46*b* of the first mesh clutch 24 are synchronized by the synchronizing device 78 in the transfer 26, and the first mesh clutch 24 is engaged. Then, after the first mesh clutch 24 is engaged, the second mesh clutch 32 is engaged, such that the disconnected state is canceled. The 4WD vehicle 10 has a disconnect function that, in the 2WD state in which the first mesh clutch 24 and the second mesh clutch 32 are released, disconnects the propeller shaft 28 for transmitting driving force exclusively to the rear wheels 16, from the engine 12 and the rear wheels 16.

As described above, with the 4WD vehicle 10 of this example embodiment, the first inclined surface 46*d* in which the length in the rotational axis C1 direction increases in the direction of arrow A1, which is the direction in which the first meshing teeth 46*b* rotates when the 4WD vehicle 10 is traveling forward, is formed along the entire tooth width of the first meshing teeth 46*b* of the first movable sleeve 46 in the first mesh clutch 24, and the first inclined surface 38*f* in which the length in the rotational axis C1 direction decreases in the direction of arrow A1 is formed along the entire tooth width of the first meshing teeth 38*c* of the first ring gear 38 in the first mesh clutch 24. When the first meshing teeth 46*b* of the first movable sleeve 46 fit in between the first meshing teeth 38*c* of the first ring gear 38, the rotation speed of the first meshing teeth 38*c* wants to decrease relative to the first meshing teeth 46*b* due to the rotational resistance of the propeller shaft 28 and the like. Therefore, if a mountain-shaped chamfer is provided on each of the first meshing teeth 38*c* and 46*b*, for example, a component force that tries to separate the first meshing teeth 38*c* and 46*b* in the rotational axis C1 direction acts by the abutment of these chamfered portions, and tooth jump may consequently occur. However, when the one-sided chamfers CF1 and CF2 having the first inclined surfaces 38*f* and 46*b* are provided along the entire tooth width of the first meshing teeth 38*c* and 46*b*, the first meshing teeth 38*c* and 46*b* abut at the parallel surfaces 38*g* and 46*f* that are parallel to the rotational axis C1, which are formed on the first meshing teeth 38*c* and 46*b*, respectively. Therefore, a component force that tries to separate the first meshing teeth 38*c* and 46*b* in the rotational axis C1 direction is not generated, and movement of the first meshing teeth 46*b* in the rotational axis C1 direction toward the first meshing teeth 38*c* is no longer impeded.

Also, with the 4WD vehicle 10 of this example embodiment, both the second meshing teeth 106*a* of the fixed engagement member 106 and the second meshing teeth 108*b* of the second movable sleeve 108 in the second mesh clutch 32 have a flat shape in which the length in the rotational axis C2 direction does not change in the direction of arrow A2, which is the direction in which the second meshing teeth 108*b* of the second movable sleeve 108 rotates relative to the second meshing teeth 106*a* of the fixed engagement member 106 when the 4WD vehicle 10 is traveling forward, for example. For example, when using a differential gear unit having a chamfer on the second meshing teeth 106*a* and 108b of the second mesh clutch 32, and the rotational direction of differential rotation of the second meshing teeth 106a and 108b changes in the second mesh clutch 32 when the disconnected state is canceled, tooth jump may occur due to the abutment of the chamfered portions of these second meshing teeth 106a and 108b. However, as described above, by making the second meshing teeth 106a and 108b of the second mesh clutch 32 flat, jumping of the second meshing teeth 106a and 108b in the second mesh clutch 32 is able to be prevented even if the rotational direction of differential rotation of the second meshing teeth 106a and 108b changes.

Also, with the 4WD vehicle 10 of this example embodiment, the long teeth 106c and 108d in which the length in the rotational axis C2 direction is long, and the short teeth 106b and 108c in which the length in the rotational axis C2 direction is short, are arranged alternately in the direction of arrow A2, which is the direction in which the long teeth 106c and 108d and the short teeth 106b and 108c rotate, in the second mesh clutch 32. Therefore, even if the accelerator is suddenly depressed a large amount, for example, such that the front wheels 14 slip and the relative rotation speed of the second meshing teeth 106a and 108b in the second mesh clutch 32 becomes relatively large when the 4WD vehicle 10 is traveling, for example, the time that it takes from when the flat surfaces 106e and 108f of the long teeth 106c and 108d of the second meshing teeth 106a and 108b are abutted together until the long teeth 106c and 108d of the second meshing teeth 106a and 108b abut the next time doubles, so sufficient travel time of the long teeth 106c and 108d of the second meshing teeth 106a and 108b that travel in the meshing direction is able to be ensured. Therefore, jumping of the second meshing teeth 106a and 108b in the second mesh clutch 32 is able to be suitable inhibited.

Also, with the 4WD vehicle 10 of this example embodiment, when the 4WD vehicle 10 is traveling in reverse, cancelation of the disconnected state is prohibited. The rotational direction of the differential rotation of the first meshing teeth 38c and 46b of the first mesh clutch 24 when the 4WD vehicle 10 is traveling forward is the opposite direction when the 4WD vehicle 10 is traveling in reverse, so when the disconnected state is canceled, jumping tends to occur due to the abutment of the chamfered portions of the first meshing teeth 38c and 46b of the first mesh clutch 24. However, as described above, when the 4WD vehicle 10 is traveling in reverse, jumping of the first meshing teeth 38c and 46b of the first mesh clutch 24 is able to be suitably inhibited by prohibiting cancelation of the disconnected state.

While the example embodiments of the invention have been described above in detail with reference to the drawings, the invention may also be applied in other modes.

For example, the 4WD vehicle 10 of the example embodiment described above is a FF-based vehicle that includes the front wheel differential gear unit 20 having the transfer 26, but the invention may also be carried out in combination with a FR-based vehicle or a RR-based vehicle or the like as appropriate. With a FR-based vehicle or a RR-based vehicle, a rear wheel differential gear unit having a structure substantially similar to that of the front wheel differential gear unit 20 described above is used with rear wheels.

Also, in the differential gear unit 30 of the 4WD vehicle 10 of the example embodiment described above, the long teeth 106c and 108d in which the length dimension in the rotational axis C2 direction is long and the short teeth 106b and 108d in which the length dimension in the rotational axis C2 direction is short are provided on the second meshing teeth 106a and 108b of the second mesh clutch 32, but the length dimension of the second mesh clutch 32 in the rotational axis C2 direction may also be constant.

Also, the differential gear unit 30 of the 4WD vehicle 10 of the example embodiment described above is not provided with a synchronizing device that synchronizes the rotations of the second meshing teeth 106a and 108b of the second mesh clutch 32, e.g., the synchronizing device 78 provided in the transfer 26, but the differential gear unit 30 may also be provided with a synchronizing device.

The example embodiments described above are merely examples. That is, the invention may be carried out in modes that have been modified or improved in any of a variety of ways based on the knowledge of one skilled in the art.

What is claimed is:

1. A four-wheel-drive vehicle with a disconnect function, the four-wheel-drive vehicle:
    a first mesh clutch as a connecting/disconnecting mechanism that selectively connects and disconnects a power transmitting path between a driving source and a power transmitting member,
    a second mesh clutch as a connecting/disconnecting mechanism that selectively connects and disconnects a power transmitting path between auxiliary driving wheels and the power transmitting member, the four-wheel-drive vehicle being selectively placed in a two-wheel-drive state in which driving force is transmitted from the driving source to left and right main driving wheels by disengagement of the first mesh clutch and the second mesh clutch, and a four-wheel-drive state in which driving force is transmitted from the driving source also to the left and right auxiliary driving wheels by engagement of the first mesh clutch and the second mesh clutch; and
    a synchronizer that synchronizes rotation of meshing teeth on the driving source side of the first mesh clutch with rotation of meshing teeth on the power transmitting member side of the first mesh clutch before the first mesh clutch is engaged,
    wherein:
        the rotations of the meshing teeth of the first mesh clutch are synchronized with each other by the synchronizer and the first mesh clutch is engaged, and then the second mesh clutch is engaged, when a disconnected state in which the first mesh clutch and the second mesh clutch are disengaged is canceled from a state in which the disconnected state is established;
        each of the meshing teeth on the driving source side of the first mesh clutch has an inclined surface that extends along an entire tooth width of the meshing tooth and that is configured such that a length of the meshing tooth in a rotational axis direction increases in a direction in which the meshing teeth on the driving source side rotate when the four-wheel-drive vehicle is traveling forward, and each of the meshing teeth on the power transmitting member side of the first mesh clutch has an inclined surface that extends along an entire tooth width of the meshing tooth and that is configured such that a length of the meshing tooth in the rotational axis direction decreases in the direction in which the meshing teeth on the driving source side rotate; and
        each of meshing teeth on the power transmitting member side of the second mesh clutch and meshing teeth on the auxiliary driving wheel side of the second mesh clutch has a flat shape such that a length of the meshing tooth in a rotational axis direction does not change in a direction in which the meshing teeth on the auxiliary driving wheel side rotate when the four-wheel-drive vehicle is traveling forward.

2. The four-wheel-drive vehicle according to claim 1, wherein long meshing teeth of which a length in the rotational axis direction is long and short meshing teeth of which a length in the rotational axis direction is short are arranged alternately in the direction in which the meshing teeth rotate, in the second mesh clutch.

3. The four-wheel-drive vehicle according to claim 1, wherein the disconnected state is not canceled when the four-wheel-drive vehicle is traveling in reverse.

4. The four-wheel-drive vehicle according to claim 2, wherein the disconnected state is not canceled when the four-wheel-drive vehicle is traveling in reverse.

* * * * *